US006876835B1

(12) United States Patent
Marko et al.

(10) Patent No.: US 6,876,835 B1
(45) Date of Patent: Apr. 5, 2005

(54) METHOD AND APPARATUS FOR PROVIDING ON-DEMAND ACCESS OF STORED CONTENT AT A RECEIVER IN A DIGITAL BROADCAST SYSTEM

(75) Inventors: Paul D. Marko, Pembroke Pines, FL (US); Daniel Murphy, Falls Church, VA (US); Craig P. Wadin, Sunrise, FL (US)

(73) Assignee: XM Satellite Radio Inc., Washington, DC (US)

( * ) Notice: Subject to any disclaimer, the term of this patent is extended or adjusted under 35 U.S.C. 154(b) by 691 days.

(21) Appl. No.: 09/695,139

(22) Filed: Oct. 25, 2000

(51) Int. Cl.[7] ............................ H04B 1/16; H04H 1/00

(52) U.S. Cl. ................ 455/3.06; 455/154.1; 455/158.1; 455/166.2; 455/185.1; 455/186.1; 455/3.02

(58) Field of Search ............................... 455/3.02, 3.06, 455/154.1, 158.1, 158.2, 158.3, 158.4, 158.5, 161.2, 166.2, 185.1, 186.1, 186.2, 45; 725/31; 375/259

(56) References Cited

U.S. PATENT DOCUMENTS

| | | | | | |
|---|---|---|---|---|---|
| 5,339,239 | A | | 8/1994 | Manabe et al. | 364/401 |
| 5,406,626 | A | | 4/1995 | Ryan | 380/50 |
| 5,524,051 | A | | 6/1996 | Ryan | 380/9 |
| 5,539,635 | A | | 7/1996 | Larson, Jr. | 364/401 R |
| 5,572,442 | A | | 11/1996 | Schulhof et al. | 364/514 C |
| 5,590,195 | A | | 12/1996 | Ryan | 380/9 |
| 5,732,324 | A | | 3/1998 | Rieger, III | 455/3.1 |
| 5,751,806 | A | | 5/1998 | Ryan | 380/9 |
| 5,809,144 | A | | 9/1998 | Sirbu et al. | 380/25 |
| 5,809,472 | A | | 9/1998 | Morrison | 704/500 |
| 5,815,671 | A | | 9/1998 | Morrison | 395/200.77 |
| 5,819,049 | A | | 10/1998 | Rietmann | 395/200.69 |
| 5,889,860 | A | | 3/1999 | Eller et al. | 380/4 |
| 5,914,941 | A | | 6/1999 | Janky | 370/313 |
| 6,014,569 | A | * | 1/2000 | Bottum | 455/466 |
| 6,487,720 | B1 | * | 11/2002 | Ohishi | 725/31 |
| 6,608,994 | B1 | * | 8/2003 | Wegener et al. | 455/3.06 |
| 6,658,062 | B1 | * | 12/2003 | Nakatsuyama | 375/259 |

* cited by examiner

*Primary Examiner*—Nay Maung
*Assistant Examiner*—Philip J. Sobutka
(74) *Attorney, Agent, or Firm*—Roylance, Abrams, Berdo & Goodman, L.L.P.

(57) ABSTRACT

A receiver in a digital broadcast system is provided for storing broadcast content files for on-demand playback purposes. The content files are transmitted in a partitioned format. Users can select which content files are to be captured in a memory device following reception. The receiver is operable to monitor the reception of content file segments and, when a selected on-demand content file has been completely received, to generate an alert message to notify a user that the content is available for retrieval from the memory device and playback via an output device.

13 Claims, 9 Drawing Sheets

METHOD AND APPARATUS FOR PROVIDING ON-DEMAND ACCESS OF STORED CONTENT AT A RECEIVER IN A DIGITAL BROADCAST SYSTEM

CROSS REFERENCE TO RELATED APPLICATIONS

Related subject matter is disclosed and claimed in co-pending U.S. patent application Ser. No. 09/695,226 of Paul D. Marko et al filed even date herewith for "Method and Apparatus for Employing Stored Content at Receivers to Improve Efficiency of Broadcast System Bandwidth Use"; in co-pending U.S. patent application Ser. No. 09/695,081 of Paul D. Marko et al filed even date herewith for "Method and Apparatus for Controlling User Access and Decryption of Locally Stored Content at Receivers in a Digital Broadcast System"; in co-pending U.S. patent application Ser. No. 09/695,228 of Paul D. Marko et al filed even date herewith for "Method and Apparatus for Implementing File Transfers to Receivers in a Digital Broadcast System"; in co-pending U.S. patent application Ser. No. 09/695,315 of Paul D. Marko et al filed even date herewith for "Method and Apparatus for Prompting a Reverse Channel Response From a Receiver in a Digital Broadcast System"; in co-pending U.S. patent application Ser. No. 09/388,926, filed by Hien D. Ma et al on Nov. 4, 1999; and in co-pending U.S. patent application Ser. No. 09/433,862, filed by Paul D. Marko et al on Nov. 4, 1999; all of said applications being expressly incorporated herein by reference.

FIELD OF THE INVENTION

The invention relates generally to an apparatus and method for providing users in a digital broadcast system with on-demand access to content that is stored locally at user receivers.

BACKGROUND OF THE INVENTION

Satellite digital audio radio service (SDARS), a satellite broadcast service established by the U.S. Federal Communications Commission (FCC), has been proposed using satellite transmission of digital audio programs to radio receivers. The radio receivers can be stationary receivers (i.e., with a receiver antenna pointed for optimal line of sight (LOS) reception from a satellite) or mobile receivers (e.g., a receiver that is hand-carried by a user or is mounted in a vehicle).

The type of content which can be distributed in an SDARS system or a similar digital broadcast system typical includes audio programs such as music recordings, news programs and talk shows, among other programs, and advertisements. A digital broadcast also typically comprises dialogue segments from a broadcast channel host or other program host which occur between the audio programs and advertisements presented on a broadcast channel.

A significant amount of the content that is to be broadcast is predetermined prior to transmission such as popular songs. Radio stations, for example, frequently use play lists to determine how often a selected number of songs, which are identified as being most popular at a given point in time, are to be broadcast. Popular songs and other programs which can be repeated on a broadcast channel are in contrast to "live" commentary provided by a broadcast channel host, talk show host or other commentator, for example.

Since bandwidth in a digital broadcast system is limited and valuable, efficient use of the bandwidth is desirable. Accordingly, a digital broadcast system is proposed in U.S. patent application Ser. No. 09/695,226, filed concurrently herewith to Marko et al for "Method and Apparatus for Employing Stored Content at Receivers to Improve Efficiency of Broadcast System Bandwidth Use", which provides for local storage devices at receivers for storing selected content (e.g., audio programs). The receivers are configured to receive a broadcast signal and to generate an output signal for playback via a loudspeaker, for example, using content transmitted in the broadcast signal, or by accessing and retrieving from the local storage device previously stored content segments that were identified in the broadcast signal.

The local storage device can also be used to store content consisting of relatively large files that have been transmitted to the user receiver via the digital broadcast system. The files can provide updated weather reports, maps, software, advertisements and so on. Due to the size of the files, the digital broadcast system partitions a large file and transmits the partitions in respective bursts to the user receivers. As described in U.S. patent application Ser. No. 09/695,228, to Marko et al for "Method and Apparatus for Implementing File Transfers to Receivers in a Digital Broadcast System" and filed concurrently herewith, the partitions are rebroadcast a number of times. The receivers are configured to buffer the partitions and to monitor the reception and buffering of partitions until substantially all of the file has been captured in a memory device. It would be advantageous to have a receiver operable to generate messages to the user that updated content is available from the local storage device for on-demand access. It would also be advantageous to have the ability to transmit content at a relatively low bit rate that can be captured and stored via the local storage device at a receiver for access at a later time.

SUMMARY OF THE INVENTION

The above-described advantages and other advantages are realized by a receiver which is operable in accordance with the present invention to allow for the playback in real-time of a selected broadcast channel (e.g., a music channel) transmitted via the broadcast signal, while receiving and buffering large files, as well as other content, intended to be received and played back at a later time and on-demand by the user.

In accordance with another aspect of the present invention, messages are generated after non-real time content has been sent to receivers via the broadcast signal to indicate to users that the content has been captured at the local storage device and is available for on-demand access.

In accordance with yet another aspect of the present invention, different types of content are sent as partitions at relatively low bit rates in the broadcast signal. The different types of content in the broadcast signal are provided with unique codes. The receiver allows a user to select which types of on-demand content are to be captured via the local storage device.

In accordance with still yet another aspect of the present invention, the receiver is configured to monitor the codes corresponding to the content in the broadcast signal and to capture content segments having one of the codes selected by the user.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
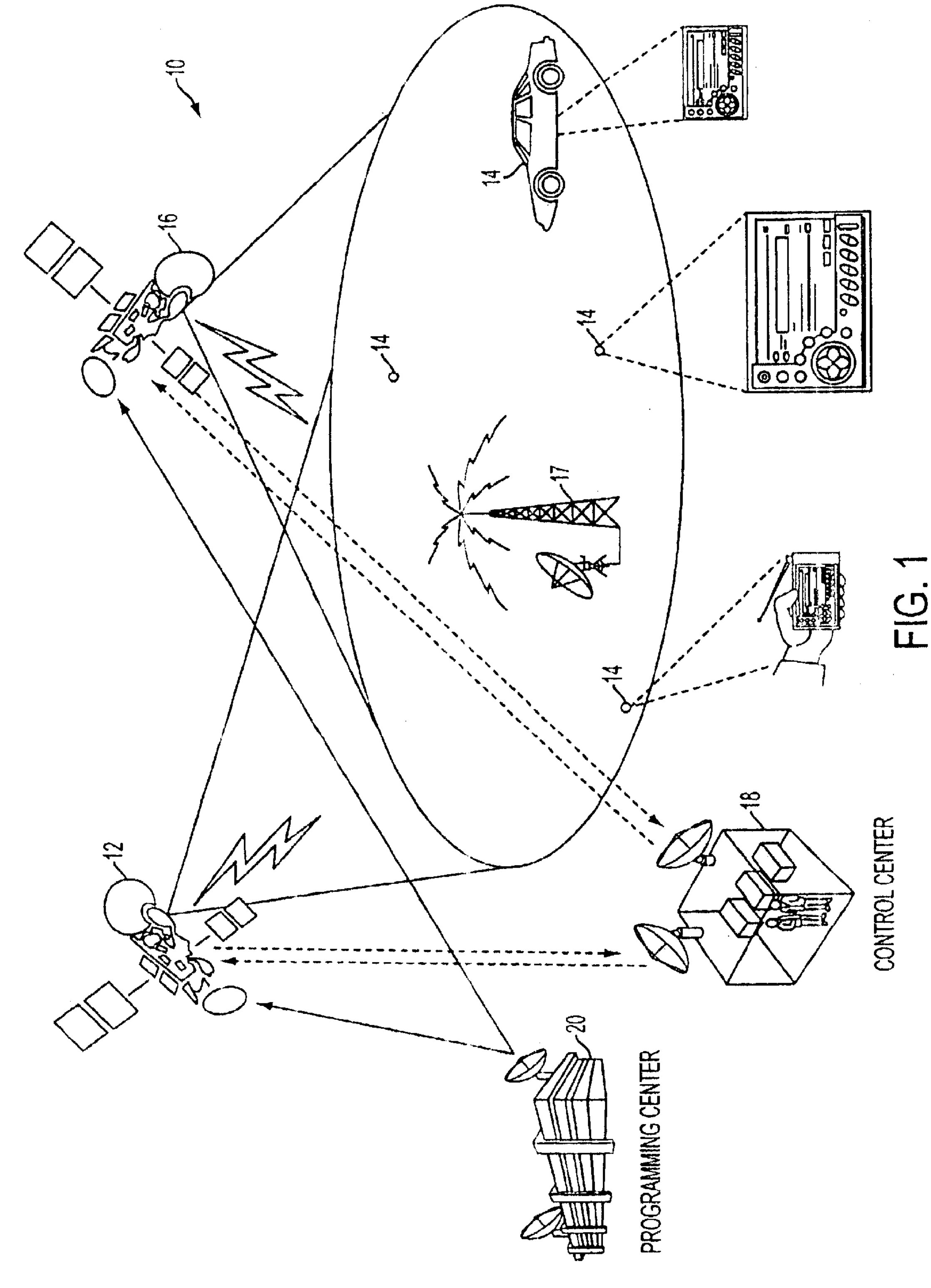
FIG. 1 illustrates an SDARS system constructed in accordance with an embodiment of the present invention.

FIG. 1 depicts a satellite broadcast system 10 which comprises at least one geostationary satellite 12, for example, for line of sight (LOS) satellite signal reception at receiver units indicated generally at 14. The satellite broadcast system 10 can be used for SDARS, for example. Another geostationary satellite 16 at a different orbital position is preferably provided for diversity purposes. One or more terrestrial repeaters 17 can be provided to repeat satellite signals from one of the satellites in geographic areas where LOS reception is obscured by tall buildings, hills and other obstructions. It is to be understood that different numbers of satellites can be used, and satellites in other types of orbits (e.g., elliptical orbits) can be used. Alternatively, a broadcast signals can be sent using only a terrestrial transmission system and no satellites.

As illustrated in FIG. 1, a receiver unit 14 can be configured for stationary use (e.g., on a subscriber's premises), or mobile use (e.g., portable use or mobile use in a vehicle), or both. A control center 18 is provided for telemetry, tracking and control of the satellites 12 and 16. A programming center 20 is provided to generate and transmit a composite data stream via the satellites 12 and 16 which comprises a plurality of broadcast channels.

Figure 2:
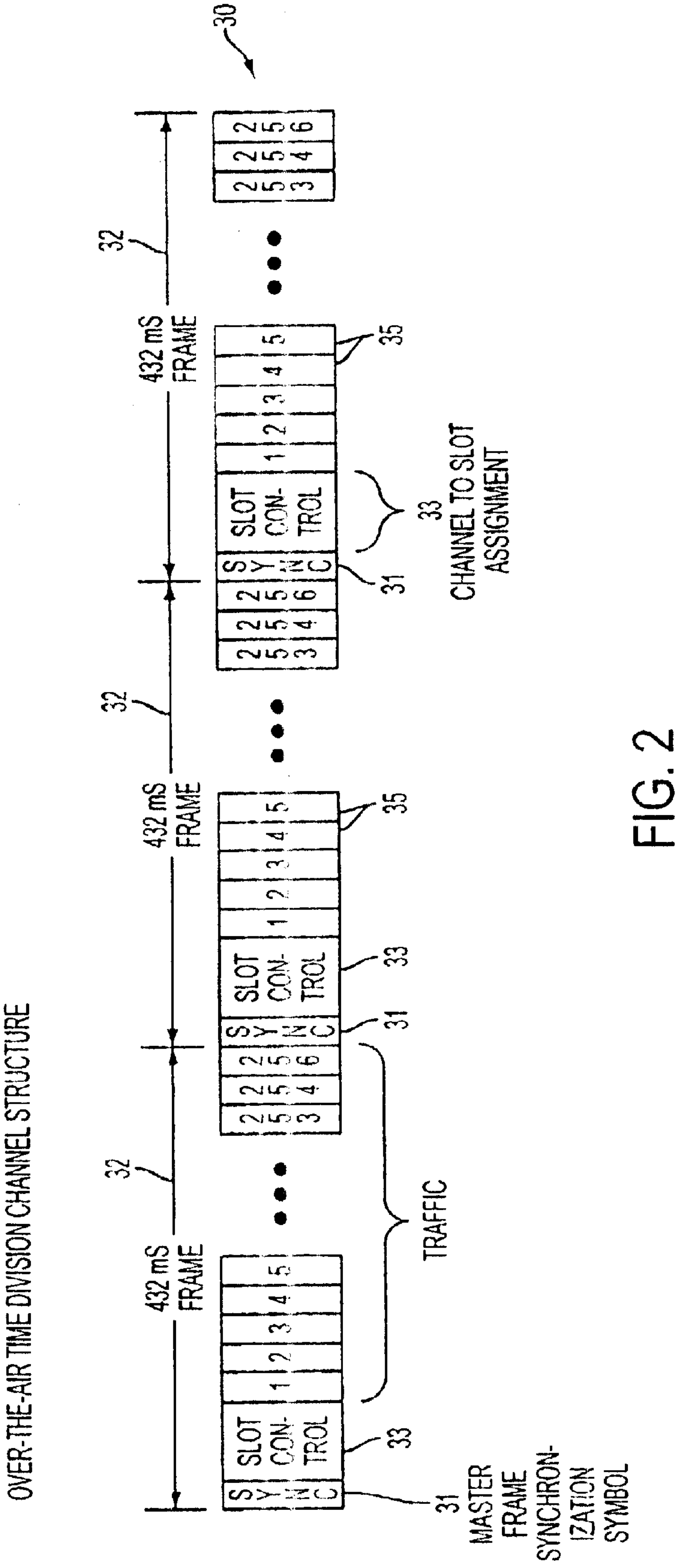
FIG. 2 illustrates a time division multiplexed data stream for broadcast transmission in accordance with an embodiment of the present invention.

An exemplary composite data stream 30 is illustrated in FIG. 2. The system 10 can broadcast a composite data stream 30 generated, for example, by time division multiplexing a plurality of broadcast channels, along with other data such as overhead data. In the illustrated example, the composite data stream 30 comprises frames 32. Each of the frames 32 is provided with a master frame synchronization symbol 31, a slot control field 33 and a plurality of time slots 35 for transporting traffic channels (e.g., 256 time slots per frame). The slot control field 33 comprises overhead data such as channel-to-slot assignment data. The receivers are therefore configured to demultiplex a received composite data stream using the synchronization symbols and the slot control field data to playback a selected one of the broadcast channels.

The programming center 20 is configured to obtain content from different sources and providers which can comprise both analog and digital information such as audio, video, data, program label information, auxiliary information, and so on. For example, the programming center 20 can provide SDARS having on the order of 100 different program channels to transmit different types of music programs (e.g., jazz, classical, rock, religious, country, and so on) and news programs (e.g., regional, national, political, financial and sports). The SDARS can also provide emergency information, travel advisory information, educational programs and the like.

The types of content to be provided in a broadcast channel is determined manually or automatically via a computer, based on contractual and financial arrangements with information providers, and demographic and financial decisions determining the types of programming to be provided via the programming center 20. In addition, a broadcast channel 30 can comprise plural service components to provide a plurality of different services. For example, a number of service components in a broadcast channel can be related to the same service and can include an audio component and a video and/or a digital data stream comprising auxiliary information, or another audio component to insert advertising information relating to the audio or video program In accordance with an aspect of the present invention, the programming center 20 is also configured to perform file transfers to one or more receivers 14. It can be useful to transmit data to the receivers 14 that is not necessarily one of the broadcast programs for real-time reception such as a music program or news program. For example, a car manufacturer may wish to provide owners of vehicles of a particular model and manufacturing date, in which a receiver 14 is installed, with advertisements, promotions and other content. It is also desirable to send a mobile receiver updated maps, local weather or traffic reports, or news. In accordance with the present invention, the user can review this content on-demand, as described in more detail below.

Figure 3:
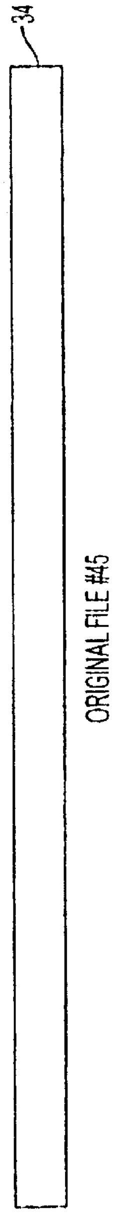
FIG. 3 illustrates a file to be transmitted in accordance with the present invention.
Figure 4:
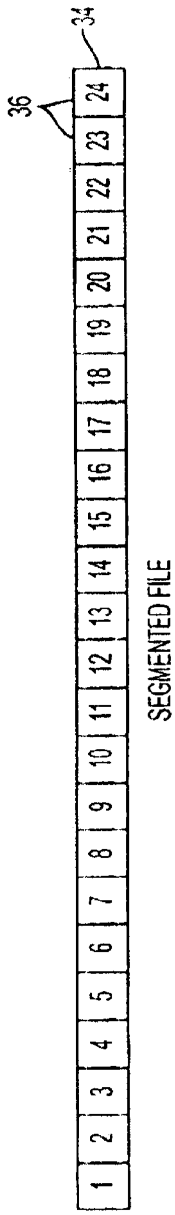
FIG. 4 depicts a segmented file constructed in accordance with an embodiment of the present invention.
Figure 5:
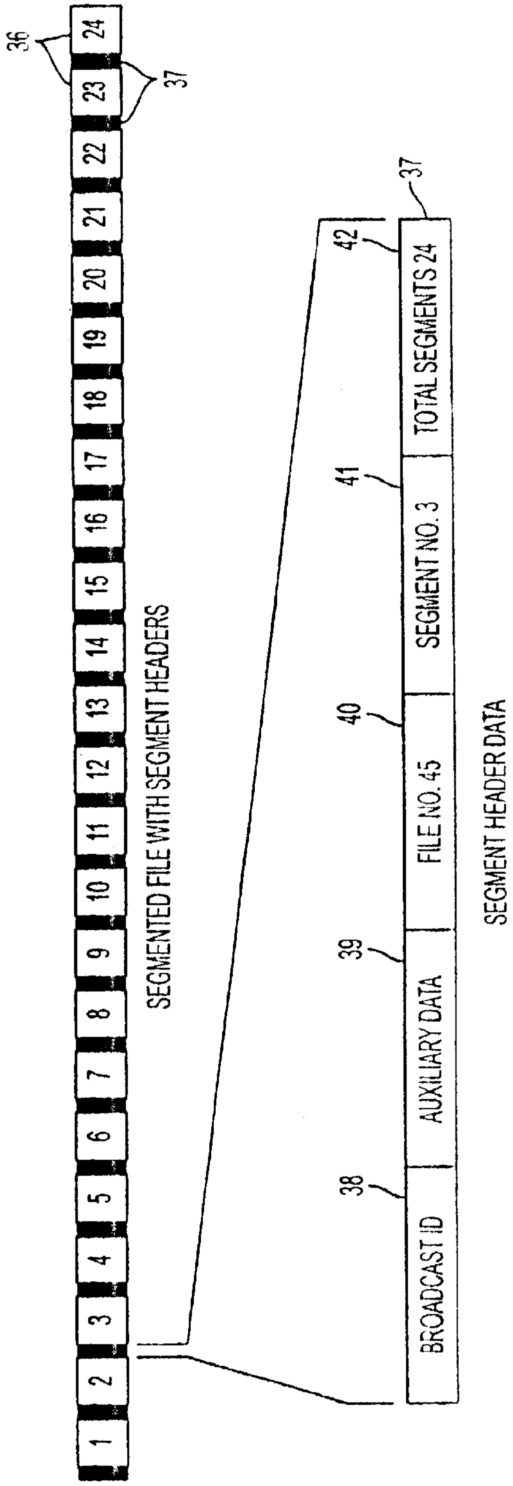
FIG. 5 depicts a segmented file and segment header data constructed in accordance with an embodiment of the present invention.

As discussed above, these types of content files are generally large files that would require a significant amount of the instantaneous broadcast system bandwidth if broadcast as one program. Further, the vehicle(s), from which the receivers 14 intended to receive the file are operated, may not be in use during the entire transmission of such a file. In accordance with the present invention, a file 34 to be transferred via the digital broadcast system such as the system 10 is partitioned at the program center 20, broadcast station 18 or other device in the transmit segment of the system for transmission as segments 36, as shown in FIGS. 3 and 4. The partitioning of the file 34 allows for smaller portions of the file (e.g., 8 kbps channels) to be interspersed with other broadcast content, hereby reducing the demand on the instantaneous bandwidth of the system. As shown in FIG. 5, the segments 36 are provided with headers 37 to facilitate their capture in a local storage device at the receiver 14. The baseband data stream illustrated in FIG. 5 can then be modulated and multiplexed as needed for transmission via the composite data stream illustrated in FIG. 2, for example.

With continued reference to FIG. 5, the segments 36 in a segmented file 34 (e.g., file 45 in FIG. 3) are each provided with a segment header 37 comprising a broadcast identifier (ID) field 38, an auxiliary data field 39, a file number field

40, a segment number field 41 and a total segments field 42. Each file 34 to be transmitted by the digital broadcast system is preferably uniquely numbered, and this number is provided in the file number field of each segment header. The segments 36 associated with a particular file 34 are preferably consecutively numbered. Thus, the total segments field 42 in a segment header 37 indicates the number of segments 36 in the message generated to transmit the file, and the segment number field 41 indicates to a receiver 14 which of the segments in the message is being received. The auxiliary data field 39 can include data such as the destination for the transferred file, that is, which of a number of telematic-enabled devices in the vehicle will be using the file. For example, the vehicle can be provided with an in-vehicle telematics bus that allows peripheral devices such as a GPS receiver, a cellular telephone and a receiver 14 to communicate with each other. For example, the file can be used by a GPS receiver in the vehicle or can be intended for the patch RAM in the vehicle engine. The auxiliary data field 39 can also include an expiration date for the transferred file. The broadcast ID 38 indicates which receivers are to receive and capture the file. As discussed below, messages can be sent to individual receivers, to groups of selected receivers, or to all receivers 14.

Figure 6:
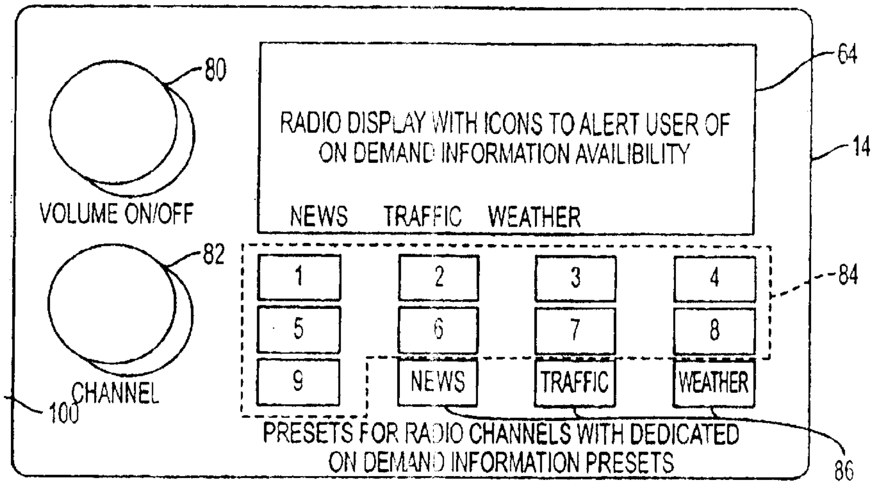
FIG. 6 illustrates an exemplary receiver user interface constructed in accordance with an embodiment of the present invention.

FIG. 6 depicts an exemplary user interface on a receiver 14. The user interface comprises input control devices 80 and 82 for turning the receiver on or off and for selecting a channel to play back a selected broadcast program such as an audio program, respectively. By way of an example, commonly assigned U.S. patent application Ser. No. 09/263,207, filed Mar. 5, 1999 and U.S. patent application Ser. No. 09/310,352, filed May 12, 1999 each describe a system for playing back a satellite broadcast program received via the receiver 14 using a conventional AM/FM tuner and loudspeaker system in a vehicle and are incorporate herein by reference. The input control device 80 can also be used to adjust the volume of the received broadcast program that is being played back.

With continued reference to FIG. 6, the receiver 14 is provided with a display. A system controller 60 in the receiver and described below is programmable to provide program information on the display 64 such as the broadcast channel of the program being received in real-time and a description of the program (e.g., "Classical Music"). A number of numeric buttons indicated generally at 84 are provided to allow, for example, the user to select broadcast program channels for reception. In accordance with the present invention, on-demand content can be received, as well as broadcast programs for real-time playback. The storage and retrieval of the on-demand content at the receiver 14 is described below. A number of buttons indicated generally at 86 are preferably provided on the receiver user interface to allow a user to commence retrieval of preselected on-demand content from a local storage device 50 (FIG. 7) such as "News", "Traffic" and "Weather" for playback in lieu of the real-time reception and playback of a broadcast program.

The receiver user interface depicted in FIG. 6 can also be configured to allow a user to select from other types of on-demand content that is not preselected such as on-demand content intended for the owner of a particular type of vehicle. The display 64, for example, can be used to provide the user with a menu of on-demand content that is available, and the user can use the buttons 84 to select from the menu. The menu can be updated periodically via the broadcast data stream 30. User selection of a particular type of content can be processed using a stored table of indices that are used by the system controller to match a particular on-demand program with a corresponding broadcast ID or file number. The receiver can then locate segments 36 in the received data stream having the corresponding broadcast ID or file number in the header 37 corresponding thereto and store the segment in the local storage device for subsequent on-demand access.

Figure 7:
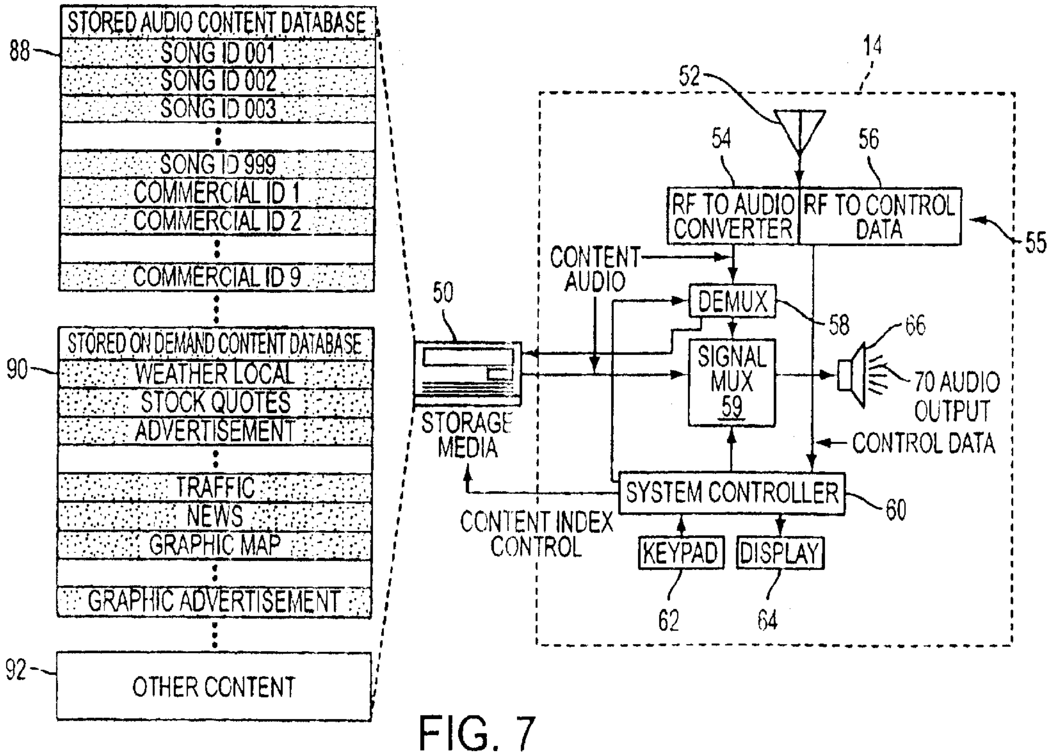
FIG. 7 is a block diagram of a receiver with a local storage device constructed in accordance with an embodiment of the present invention.

Capture and storage of segments at receivers 14 will now be described. FIG. 7 illustrates an exemplary receiver 14 with a local storage device 50 for storing received segments of files that were partitioned and broadcast. The local storage device 50 can be any memory device that can store information in a digital format and can include, but is not limited to, a floppy disc, a hard disk, a compact disc (CD), a digital video disc (DVD), an optical disc, random access memory (RAM), a FLASH memory, a disk pack, digital audio tape (DAT), or other medium for storage and retrieval of digital information. The local storage device 50 can be provided within a receiver 14 chassis or connected externally thereto.

With continued reference to FIG. 7, the receiver 14 comprises an antenna 52 for receiving a broadcast signal from at least one of the satellites 12 and 16 and/or a terrestrial repeater 17. As stated previously, the broadcast signal can originate from only a terrestrial transmission system. A converter 55 is preferably provided which is operable to perform radio frequency (RF) downconversion, and any demodulation, synchronization, demultiplexing, de-interleaving and decoding functions performed as part of the transport layer at a broadcast station in the system 10, and described in the afore-mentioned application Ser. No. 09/433,862, to obtain the baseband broadcast channels from the broadcast composite data stream. The receiver 14 comprises a controller 60 connected to a display 64 and keypad 62 to allow a user to select a broadcast channel, among other operations. In response to the user program channel selection, the controller 60 provides control signals to a demultiplexer 58 to select the corresponding broadcast channel for output via a loudspeaker 66 or other output device (e.g., a display or monitor).

As shown in FIG. 7, the converter 55 comprises an RF-to-audio converter 54 and an RF-to-control data converter 56 to extract, respectively, the traffic (e.g. the segments 36) and control data (e.g., headers 37) from the received signal. The traffic such as a selected audio program is preferably provided to the output device 66 via a signal multiplexer 59 as soon as the content thereof is received and processed via the converter 55 and demultiplexer 58. Traffic such as the segments 36 intended for that receiver is provided to the local storage device.

In accordance with the present invention, the converter 55 removes the segment headers 37 from the received data stream and determines from the broadcast ID field 38 or the file number field 40 whether the segment is intended for that receiver 14. The system controller 60 or the converter 55 stores selected broadcast IDs or file numbers of on-demand content that the user has selected, as well as of preselected on-demand content. If the segment is intended for that receiver, it is stored in the local storage device 50.

The size of the segments 36 and therefore the amount of memory to be allocated to each segment are preferably predefined system parameters. Accordingly, when a receiver 14 processes a segment header 37, the receiver determines how much of the local storage device 50 is needed for the file based on the data in the total segments field 42. In addition, the local storage device 50 can have sections thereof that are reserved for certain types of file transfer data such as a section 90 for on-demand content (e.g., maps, local weather or traffic advisory reports, stocks, and the like), as well as a section 88 for content segments to be retrieved and played back in an audio program, and a section 92 for other types of content.

As described in further detail below, the system controller 60 is programmable to monitor the capture of on-demand content and other content transmitted using the file transfer process described in connection with FIGS. 3–6. In accordance with an aspect of the present invention, the system controller 60 is operable to generate an alert message to the user indicating when the transfer or capture of content such as on-demand content is complete and available for payback when the user chooses. The alert message can be a message on the display 64 or an audible message via a loudspeaker 66 or both. The user can then, at any given point in time, select one of the preset buttons 86, or one of the other buttons 84 or on the display as instructed by the alert message, to playback the on-demand content.

Figure 8:
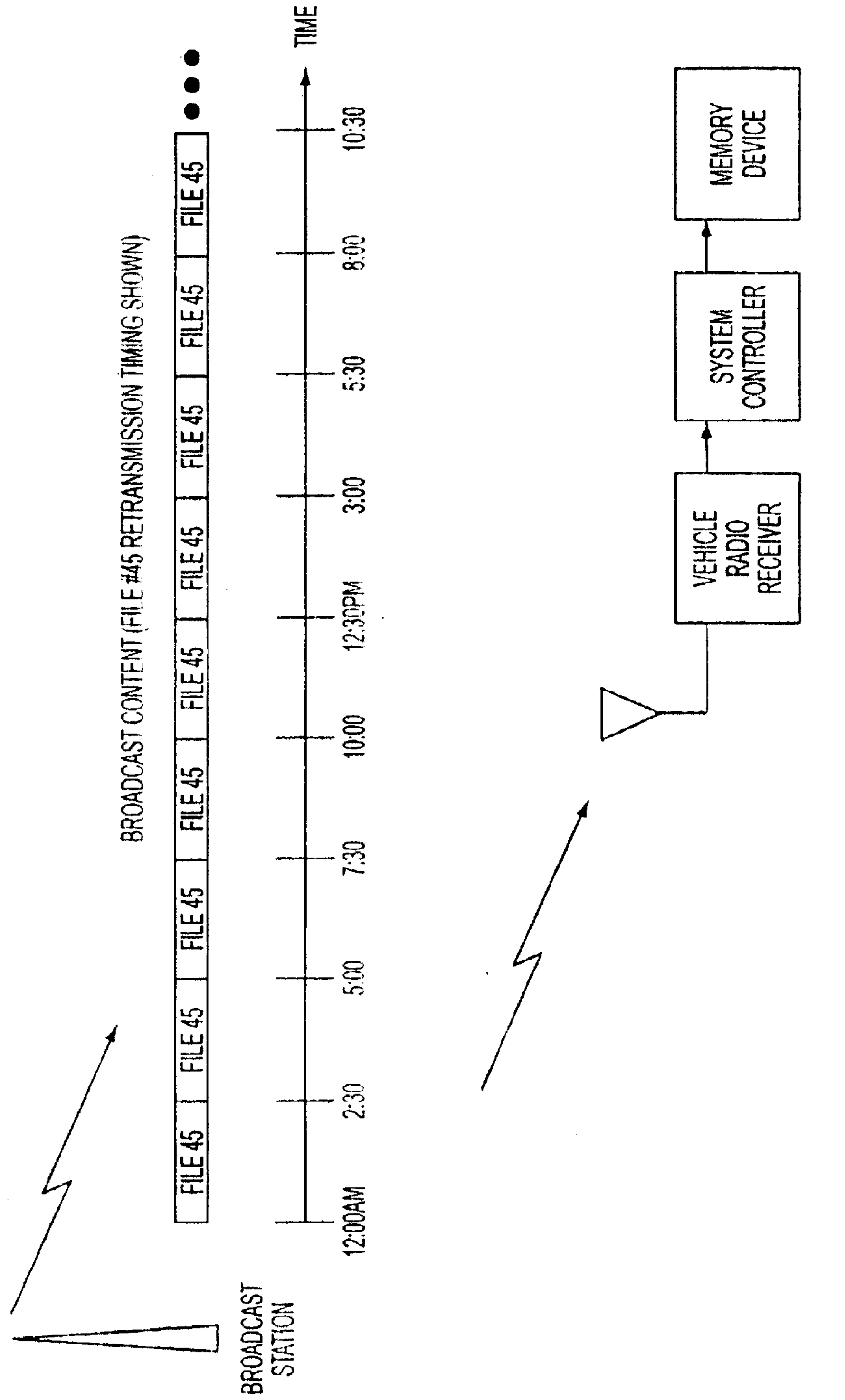
FIG. 8 illustrates retransmission of a segmented file in accordance with an embodiment of the present invention.

The broadcast station 18 is programmed to broadcast files 34 such as on-demand content for file transfer to receivers 14 on a repeated-basis for a selected number of times. For example, the broadcast station 18 can transmit a file 34 on a periodic basis. In the illustrated example, the file "45" is partitioned and the resulting segments are interspersed in the composite data stream so as to require 2.5 hours to transmit all of the segments in the file. As shown in FIG. 8, the file is retransmitted every 2.5 hours and therefore essentially continuously. It is to be understood that a file can be retransmitted intermittently, or in a time divided manner in which time gaps are present between or within segments, and on various duty cycles such as only once or twice a day, on a weekly or multi-weekly basis, and so on. The duty cycle depends on the type of content in the file, how often the content needs to be updated, the manner in which the content is used (i.e., content that is viewed on-demand frequently or infrequently by users, or content that is employed in a background application by a telematic-enabled device such as GPS map updating by a GPS receiver), the available bandwidth, among other factors.

Figure 9:
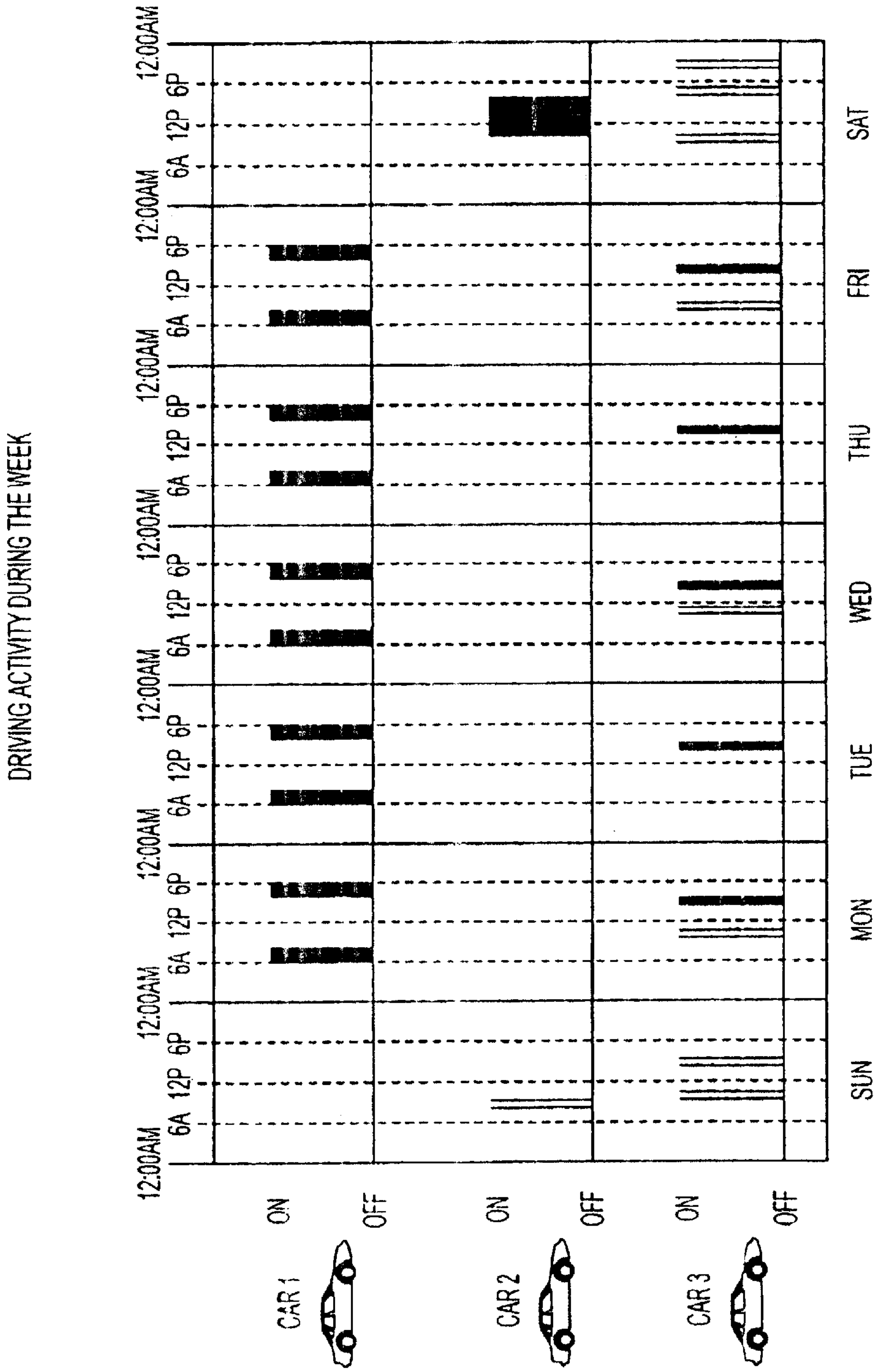
FIG. 9 illustrates exemplary use patterns for vehicles with mobile receivers.

FIG. 9 depicts exemplary vehicle use patterns. The receiver 14 preferably receives power from the vehicle battery and is equipped with a back-up battery source. Accordingly, the frequency with which a vehicle is used affects how the receiver captures files. Car 1 in FIG. 8 illustrates a user who uses a vehicle primarily for commuting to work on weekdays at essentially predictable commuting times each day (e.g., 6:00–7:30 am and 4:30–6:00 pm). Car 2 illustrates a user who uses a vehicle less frequently than Car 1, but one of the trips is relatively long, that is, a short trip from 8:45–9:00 am on Sunday to go to church and a longer trip on Saturday from 9:00 am until 4:00 pm. Finally, the user of Car 3 drives the vehicle more frequently than the users of Cars 1 and 2 and the average trip is of less duration (e.g., for errands). Accordingly, a file intended to be transferred to users who are prone to driving activity similar to the chart for Car 3 may need to be retransmitted more frequently.

Figure 10:
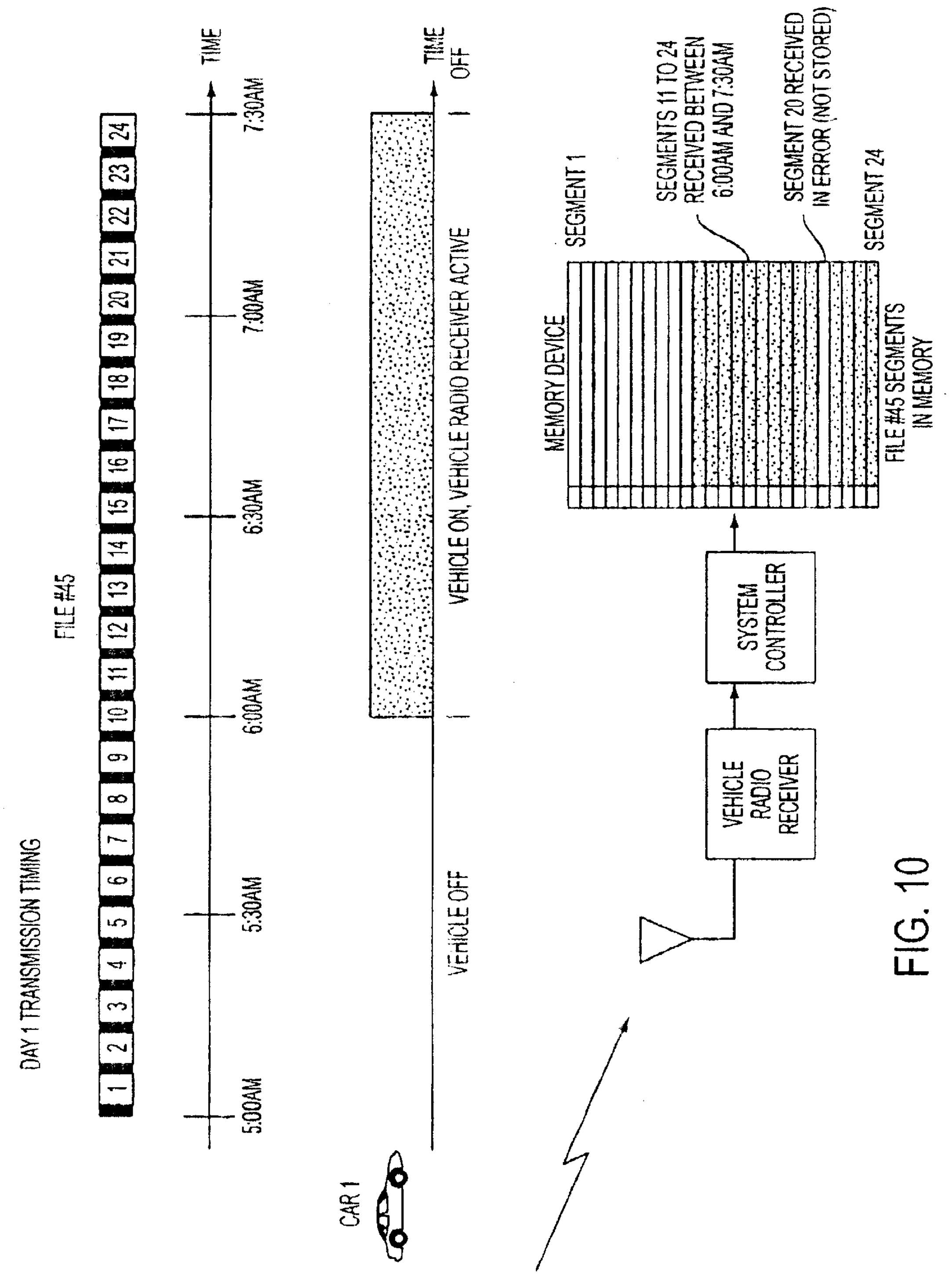
FIGS. 10, 11 and 12 illustrate, respectively, file transfer and capture of segments in accordance with an embodiment of the present invention.

The capture of a transmitted, partitioned file 34 will be described with reference to Car 1 for illustrative purposes. With reference to FIG. 10, file "45" is transmitted at periodic intervals with one interval commencing at 5:00 am. Thus, a receiver 14 in Car 1 is able to receive segments 11 through 24. The system controller 60 in the receiver determines from the segment headers 37 how much memory to allocate and which segments 36 were received. By way of an example, one of the segments was unsuccessfully captured (e.g., due to service outage).

Figure 11:
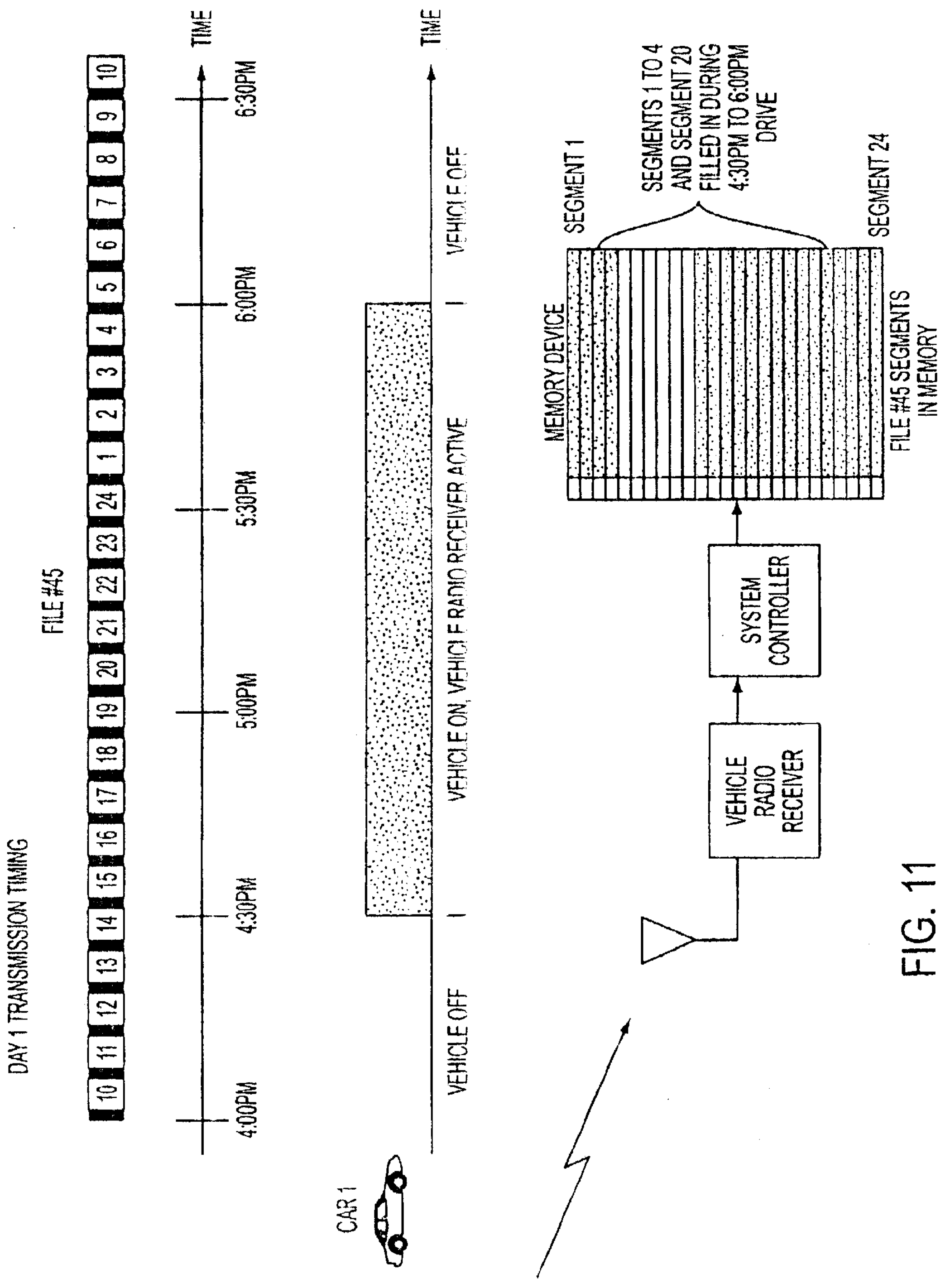

With reference to FIG. 11, the receiver 14 in Car 1 receives and stores additional segments of file 45 (i.e., segments 1–4) during the evening commute home from work, as well as the segment that was unsuccessfully received during the earlier commute (e.g., segment 20). The segments 15–19 and 21–24 received during the morning commute are discarded by the receiver since they have already been successfully received and stored in the local storage device 50.

Figure 12:
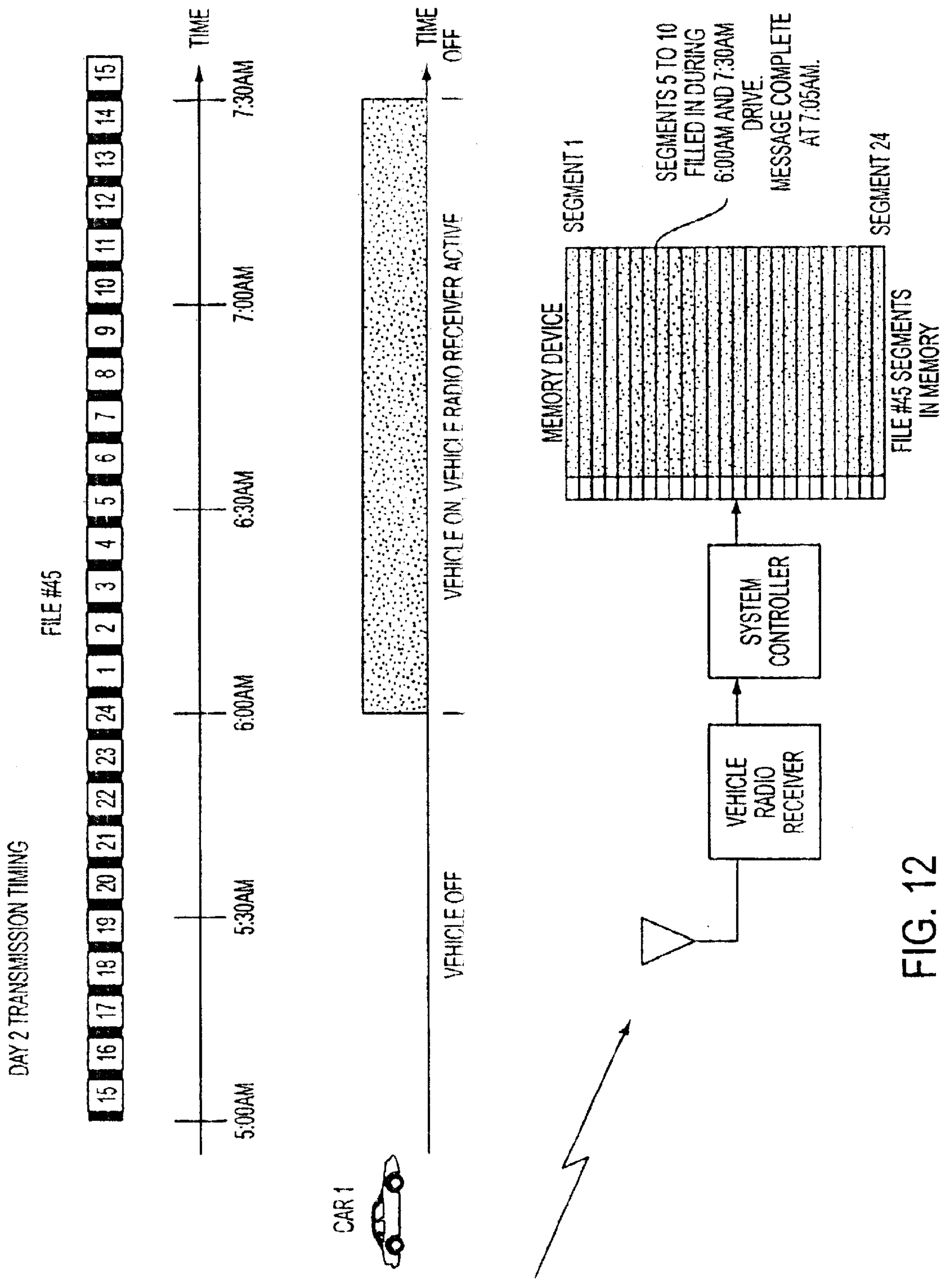

The remaining segments 5–10 of file 45 are received during the morning commute of the following day, as illustrated in FIG. 12. The system controller 60 is programmed to then generate an alert message to the user to indicate that the message or file transfer is complete once the receiver has determined that all of the segments for that message or file have been successfully received and stored. The alert message, for example, can be annunciated on the display device 64 of the receiver 14 (e.g., an alphanumeric message such as "Message Complete") to prompt the user to implement a playback feature of the present invention whereby stored content from the local storage device 50 is played back whenever the user elects to do so. The alert message can even be more specific to distinguish between more than one file transfer. It is to be understood that the system 10 can employ diversity methods for broadcasting the composite data stream, in which case the receiver 14 is configured to selectively combine received, diversity, baseband streams prior to extracting the desired segments therefrom.

In accordance with present invention, the receiver 14 can be programmed with a wake-up feature when the buffer in the local storage device 50 that is allocated to the message (e.g., file 45) is substantially full (e.g., 95% full. Since the receiver can be provided with data relating to the rebroadcast times for messages and files, the receiver can use the wake-up feature to automatically tune to a particular broadcast channel during the scheduled time(s) for a selected message or file to receive the missing segments.

It is to be understood that the regular audio programming is not interrupted via file transfer process. Since composite data stream is multiplexed, a receiver 14 can be program to receive, demultiplex and playback a selected audio program (e.g., a jazz music program) in real-time, while the receiver demultiplexes and stores segments from messages having broadcast IDs corresponding to that receiver for playback at a later time.

Although the present invention has been described with reference to a preferred embodiment thereof, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A method of providing a user with information at a receiver in a digital broadcast system comprising the steps of:

receiving content segments at said receiver, said content segments corresponding to respective partitions of content files being transmitted in said digital broadcast system, said content segments being transmitted with control data indicating which of said content segments relate to which of said content files, the total number of said content segments that constitute at least one of said content files, and segment identifiers to distinguish each of said content segments that belong in said at least one of said content files, some of said content files being on-demand files and provided with a file identification code indicating that said content can be selected for on-demand play back at said receiver;

storing at least one said file identification code corresponding to a selected one of said on-demand files in a memory device;

determining which received said content segments correspond to the selected said on-demand file using said control data, and said file identification code in said memory device; and storing said content segments corresponding to said on-demand file in said memory device.

2. A method as claimed in claim 1, further comprising the step of monitoring which of said content segments corresponding to said on-demand file are stored in said memory device and which said content segments have not yet been received using said segment identifiers.

3. A receiver in a digital broadcast system comprising:

a memory device for storing content transmitted in a broadcast signal using said digital broadcast system, the content comprising on-demand data files which, if transmitted continuously in said broadcast signal, may require a significant amount of the instantaneous bandwidth of said digital broadcast system, said on-demand data files each being partitioned into segments that are interspersed in said broadcast signal, said broadcast signal being provided with at least one header comprising file identification codes to identify each of said on-demand data files being transmitted in said broadcast signal and segment information to indicate which of said segments in said broadcast signal correspond to which of said on-demand data files transmitted therein, said segment information comprising the total number of said segments that constitute at least one of said on-demand data files, and segment identifiers to distinguish each of said segments that belong in said at least one of said on-demand data files, said memory device also storing said file identification codes of selected said on-demand data files;

a reception device for receiving said broadcast signal; and a processing device connected to said memory device and said reception device and being programmable to process the received said broadcast signal to obtain at least part of said content transmitted therein including said segments corresponding to the selected said on-demand data files using said file identification codes stored in said memory device, and to store said segments of the selected said on-demand data files in said memory device.

4. A receiver as claimed in claim 3, wherein said processing device is operable to monitor the progress of storing said segments of the selected said on-demand data files using said segment identifiers.

5. A receiver as claimed in claim 3, wherein a portion of said memory device is allocated for at least one of the selected said on-demand data files, said receiver being provided with rebroadcast data indicating when said on-demand data files are being retransmitted via said digital broadcast system, said processing device being operable to determine when a selected amount of said portion of said memory device is being used to store said on-demand data file and to automatically operate said receiver to receive the remaining said segments corresponding to said on-demand data file using said rebroadcast data.

6. A receiver as claimed in claim 5, wherein said rebroadcast data comprises at least one of a rebroadcast time, a rebroadcast date, and a channel used to transmit said on-demand file, said processing device being operable to automatically tune said receiver to said channel indicated via said rebroadcast data at said rebroadcast time.

7. A method of providing a user with information at a receiver in a digital broadcast system comprising the steps of:

receiving content segments at said receiver, said content segments corresponding to respective partitions of content files being transmitted in said digital broadcast system, said content segments being transmitted with control data indicating which of said content segments relate to which of said content files, some of said content files being on-demand files and provided with a file identification code indicating that said content can be selected for on-demand play back at said receiver;

storing at least one said file identification code corresponding to a selected one of said on-demand files in a memory device;

determining which received said content segments correspond to the selected said on-demand file using said control data, and said file identification code in said memory device;

storing said content segments corresponding to said on-demand file in said memory device;

monitoring which of said content segments corresponding to said on-demand file are stored in said memory device and which said content segments have not yet been received; and generating a message via an output device provided on said receiver to indicate when all of said content segments corresponding to said on-demand file are available for retrieval from said memory device for playback via said receiver.

8. A method as claimed in claim 7, wherein said storing step comprises the step of allocating a portion of said memory device for said on-demand file.

9. A method as claimed in claim 8, further comprising the steps of:

receiving rebroadcast data relating to rebroadcast of said on-demand file;

determining when said portion of said memory device is storing a selected amount of said on-demand file; and operating said receiver to capture the remainder of said on-demand file in accordance with said rebroadcast data after said selected amount of said on-demand file has been received.

10. A method as claimed in claim 9, wherein said rebroadcast data indicates at least one of a rebroadcast time, a rebroadcast date, and a channel used to transmit said on-demand file.

11. A method as claimed in claim 10, further comprising the step of automatically tuning said receiver to said channel indicated via said rebroadcast data at said rebroadcast time.

12. A receiver in a digital broadcast system comprising:

a memory device for storing content transmitted in a broadcast signal using said digital broadcast system, the content comprising on-demand data files which, if transmitted continuously in said broadcast signal, may require a significant amount of the instantaneous bandwidth of said digital broadcast system, said on-demand data files each being partitioned into segments that are interspersed in said broadcast signal, said broadcast signal being provided with at least one header comprising file identification codes to identify each of said on-demand data files being transmitted in said broadcast signal and segment information to indicate which of said segments in said broadcast signal correspond to which of said on-demand data files transmitted therein, said memory device also storing said file identification codes of selected said on-demand data files;

a reception device for receiving said broadcast signal;

a processing device connected to said memory device and said reception device and being programmable to process the received said broadcast signal to obtain at least part of said content transmitted therein including said segments corresponding to the selected said on-demand data files using said file identification codes stored in said memory device, and to store said segments of the selected said on-demand data files in said memory device; and an output device connected to said processing device, said processing device being operable to generate an alert message when all of said segments corresponding to one of the selected said on-demand data files have been received.

13. A receiver as claimed in claim 12, wherein said output device comprises at least one of a display device and a speaker device, said alert message a comprising at least one of a message generated on said display device and an audible message generated via said speaker device.

* * * * *